United States Patent [19]

Thomas et al.

[11] 4,004,753
[45] Jan. 25, 1977

[54] PNEUMATIC CUSTOMER TERMINAL FOR DRIVE-UP BANKING INSTALLATIONS

[75] Inventors: William D. Thomas, Marion, Iowa; Chadwick C. Boltz, Kansas City, Mo.

[73] Assignee: Walter Kidde & Company, Inc., Clifton, N.J.

[22] Filed: Nov. 6, 1975

[21] Appl. No.: 629,327

[52] U.S. Cl. .................................... 243/19; 243/24
[51] Int. Cl.² ........................................ B65G 51/32
[58] Field of Search ............. 243/1, 19, 20, 23, 24, 243/25, 28, 36, 38; 186/1 C; 194/DIG. 23

[56] References Cited

UNITED STATES PATENTS

| 3,790,101 | 2/1974 | Weissmuller | 243/19 |
| 3,841,584 | 10/1974 | Robinson et al. | 243/19 |
| 3,851,843 | 12/1974 | Sandlin | 243/19 |

Primary Examiner—Evon C. Blunk
Assistant Examiner—James L. Rowland
Attorney, Agent, or Firm—Haven E. Simmons; James C. Nemmers

[57] ABSTRACT

The customer terminal in a pneumatic drive-up banking arrangement is provided with an inner chamber into which carriers arrive. The usual valve in the receive tube is replaced with a hinged door at the front of the inner chamber which the weight of the carrier opens, the carrier then rolling down a ramp, formed in part by the door, over the funneled mouth of the send tube to a ledge along the front of the terminal from which it can be picked up by a customer. The teller can independently return the carrier from the ledge by means of a solenoid actuated lever which flips the carrier into the send tube mouth.

6 Claims, 4 Drawing Figures

PNEUMATIC CUSTOMER TERMINAL FOR DRIVE-UP BANKING INSTALLATIONS

BACKGROUND OF THE INVENTION

The present invention is essentially an improvement of the customer terminal shown in U.S. Pat. No. 3,841,584 to Robinson et al. An incoming carrier in that terminal passes first through a valve in the receive tube and then into the rear of an inner compartment having an inclined floor down which the carrier rolls into a tray just behind and carried by a bottom hinged door on the front of the terminal normally closing the compartment. In the latter position, the carrier straddles the mouth of the send tube which opens up through the tray. When a customer's car arrives before the terminal, a tape switch opens the door to present the carrier to the customer who dispatches it to the teller by dropping it down the send tube, whereupon the door closes. Upon its return, the carrier again rolls into the tray, opening the door so that the customer can pick up the carrier. When finished, the customer returns the carrier to the tray and drives off over the tape switch which then closes the door.

One aspect of the system just described is that, unlike other pneumatic systems for drive-up banking purposes and the like, the inner compartment into which the carrier arrives forms no part of the pneumatic circulatory system per se. Rather, the air can circulate and a carrier travel through the send and receive tubes quite independently of whether the compartment is open or closed. In other pneumatic drive-up banking systems, however, the inner compartment or its equivalent is an integral part of the circulatory system in the sense that the system cannot function if the compartment is open nor, indeed, unless it is largely air tight. Several advantages accrue from the system of the Robinson et al patent.

By divorcing the inner compartment from the pneumatic circulatory system, operation of the blower need not be tied to whether the compartment is open or closed. Hence, the blower can run continuously, regardless of whether the compartment is open, in the event that humidity or temperature conditions would be apt to cause condensation in the underground tubes were the blower run only when a carrier is sent. Or the blower can be set to operate only when a carrier is actually being transported through the tubes. Construction of the compartment is thereby greatly simplified since it and the outer access door need not be air tight. Nor is the opening and closing time of that door at all critical; it can be opened or closed at any time regardless of the location of the carrier in the tubes since the pneumatic system operates irrespective of whether the door is open or closed.

The improvement of the Robinson et al system, which forms the present invention, will now be briefly recounted.

SUMMARY OF THE INVENTION

In the first place, opening and closing of the compartment door each time that a customer arrives and departs, as well as when a carrier is being sent through the system, is eliminated. Instead, the outer door, which simply slides down vertically to expose the carrier to view, is normally opened and closed only at the beginning and end of the banking day. In the second place, the valve in the receive tube is eliminated and its role assumed by a bottom hinged door closing the front of an inner chamber at the rear of the compartment into which carriers arrive from the receive tube. The air return, which otherwise would connect the receive tube upstream of the receive valve with the intake of the blower, accordingly opens up through the floor of the inner chamber behind its door. When a carrier arrives in the inner chamber whose floor is forwardly inclined, it rolls against and opens the door, thence down a ramp formed by the door, below which and covered thereby is the open mouth of the send tube, and onto a ledge along the front of the terminal for access by customers. The mouth of the send tube is sufficiently large and funneled so that it will orient the carrier down the tube no matter in what manner or attitude the carrier is returned to the compartment for dispatch to the teller. Finally, in order to enable the teller to return a carrier from the customer terminal, a solenoid impelled lever along the front of the ledge against which the carrier lies flips the latter rearwardly off the ledge when the solenoid is actuated by the teller. Since the large mouth of the send tube is bounded essentially only by the closed door of the inner chamber forming the rear wall of the compartment and the two side walls of the latter, the carrier must invariably fall into or be rebounded into the funnel of the send tube which then correctly orients it down the latter.

Other and further features and advantages of the present invention will become apparent from the more detailed description which follows and the drawings.

DESCRIPTION OF THE PREFERRED EMBODIMENT

Figure 1:
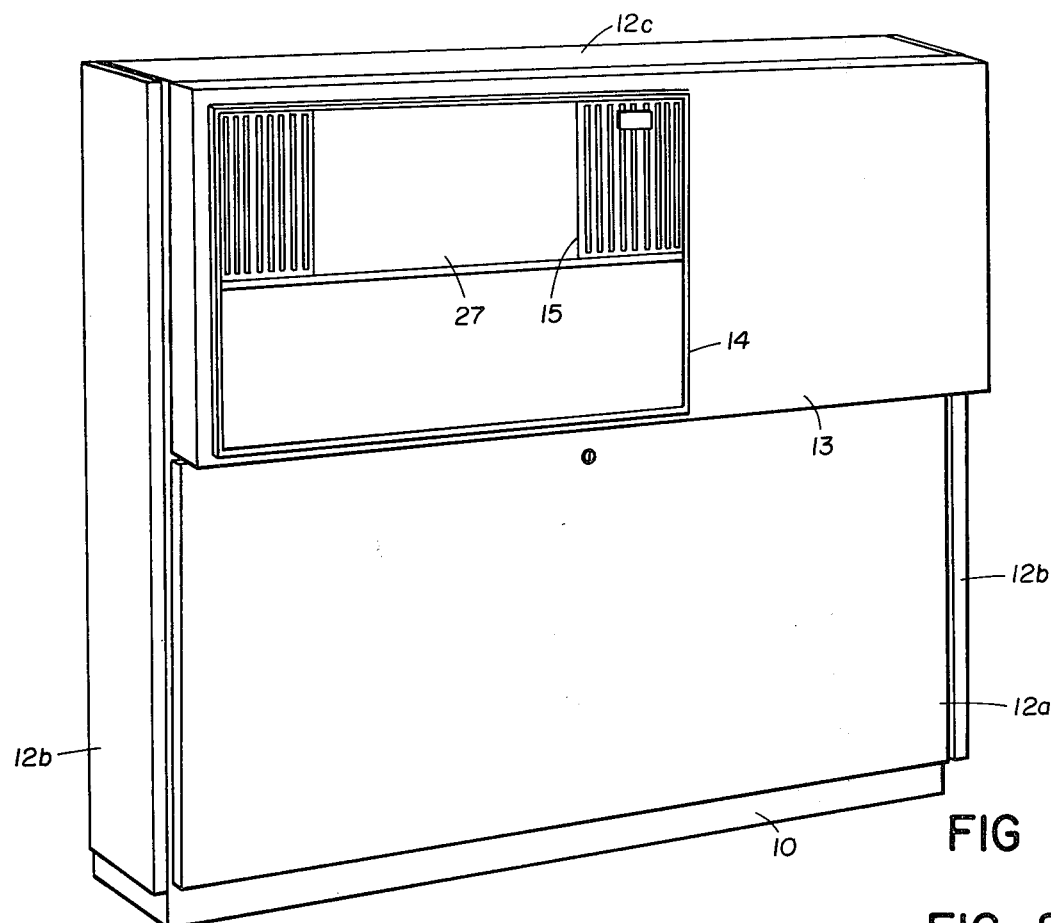
FIG. 1 is an isometric front view of a customer terminal according to the present invention shown with the compartment door in its closed position.
Figure 2:
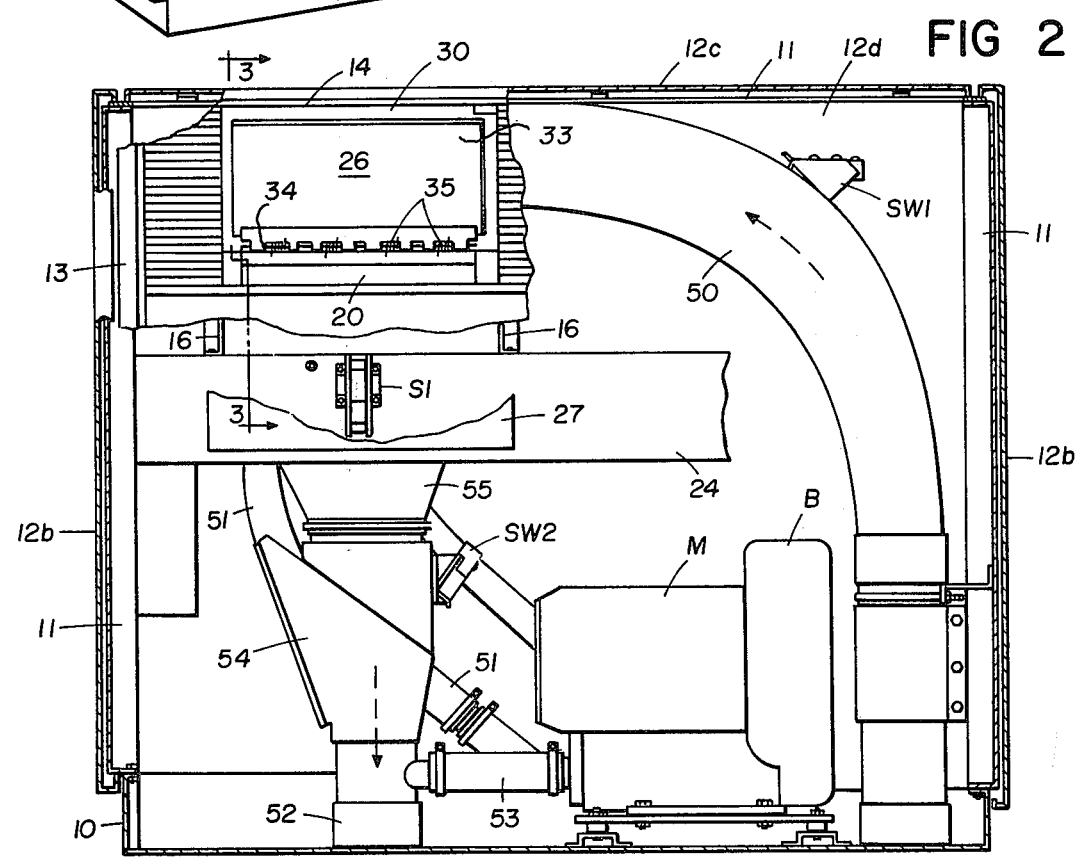
FIG. 2 is a front elevational view of the terminal of FIG. 1 with the compartment door open and certain portions of its outer enclosure broken away to illustrate the basic interior arrangement of the terminal.

As shown in FIGS. 1 and 2, the customer terminal comprises a fabricated base 10 and inner rectangular framing 11 to which is suitably secured various removable outer panels 12a, 12b, 12c and 12d which enclose the lower front, the two sides, the top and the rear of the terminal. Above the lower front panel 12a the terminal is closed by an overhanging front cover 13 fitted on its outer face with laterally offset decorative framing 14 having a rectangular compartment opening 15 in its upper central portion. From the side edges of the opening 15 a pair of laterally spaced compartment side walls 16 extend rearwardly to the back panel 12d (see FIGS. 3 and 4) and between their forward halves several forwardly and downwardly sloping plates 17a, 17b and 17c frame a rectangular send tube opening 17d. The front most plate 17c continues forwardly to form a carrier ramp 18 and is bent along its outer edge at 17e and 17f to form a transverse carrier retaining ledge 19 along and just rearward of the lower edge of the compartment opening 15. Below the opening 17d is disposed the mouth 20 for the send tube which is funneled to orient a carrier thrown therein into a vertical position so that it can exit from the mouth 20 end first.

Figure 3:
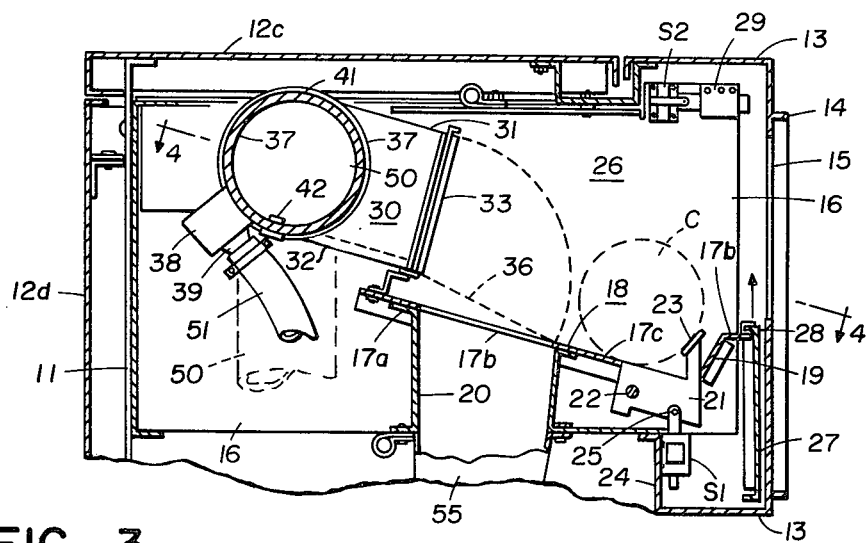
FIG. 3 is a sectional view taken along the line 3 — 3 of FIG. 2.
Figure 4:
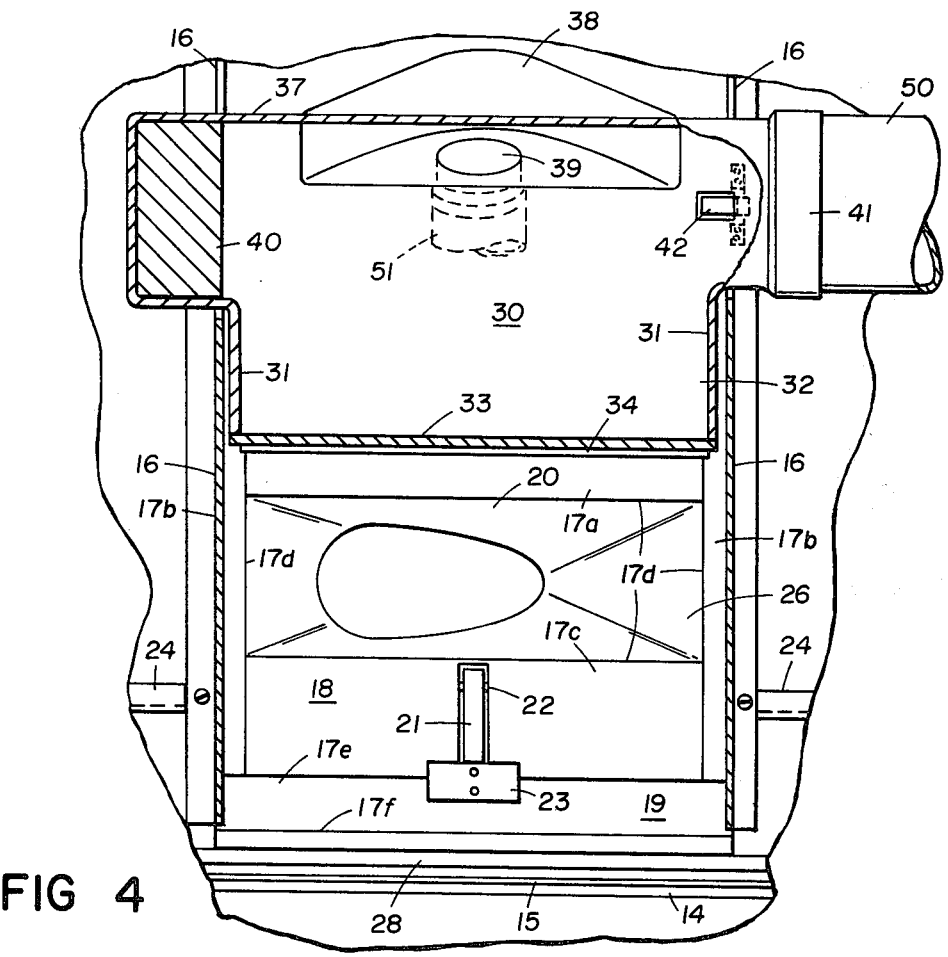
FIG. 4 is a sectional view taken along the line 4 — 4 of FIG. 3.

The ramp 18 and ledge 19 are centrally apertured in a fore-and-aft direction to receive a carrier return lever 21 horizontally pivoted at one end on a transverse shaft 22 below the ramp 18. The other end of the lever 21 is angled up through the ledge 19 and fitted with a transverse push plate 23 which centrally engages the body of a carrier C lying along the ledge 19 as indicated in FIG. 3. The lever 21 is actuated by a solenoid S1 mounted on a transverse plate 24 across the front of the terminal which also receives the lower rear edge of the cover 13. The armature of the solenoid S1 is pivotally connected to the lever 21 at 25 and is energized from the teller station.

The inner side walls 16, the ramp 18 and the ledge 19 together with the send tube mouth 20 thus essentially define a compartment 26 for access by customers through the front opening 15. During non-banking hours the opening 15 is closed by a vertically sliding door 27 within the front cover 13 having an upper lip 28 which rests upon the outer portion 17f of the ledge 19 when the door 27 is open as shown in FIG. 3. The door 27 may be suspended and opened and closed in any suitable manner (not shown) such as by a motor driven rack and pinion arrangement with appropriate open and close limit switches, the motor of course being controlled from the teller station. When closed the door 27 is locked by a latch assembly 29, driven by a solenoid S2 also energized from the teller station, which engages the underside of the lip 28.

Across the rear of the compartment 26 is disposed an inner carrier chamber 30, essentially an integral molding from suitable material, supported between the rear halves of the side walls 16 and on the plate 17a. The chamber 30 includes a rectangular front section 31, open at its front end, extending forwardly between the side walls 16 with a forwardly and downwardly sloping floor 32 which terminates just above the rear edge 17d of the send tube mouth 20. The front end of the section 31 is normally closed by a rectangular door plate 33 hinged along its bottom edge at 34 and biased to its closed position by suitable springs 35 (or by counterweights). The door 33 opens outwardly and downwardly so that it covers the send tube mouth 20, its rear face forming a forwardly sloping carrier ramp 36 from the floor 32 leading onto the ramp 18, as shown in FIG. 3. The remainder of the chamber 30 is formed by a transverse cylindrical rear section 37. The peripheral wall of the latter opens into the rear of the front section 31 and is further provided with a lower, rearwardly directed return air well 38 having a forwardly inclined opening and spigot 39. The ends of the rear section 37 are carried out over the side walls 16 and in one end is disposed a bumper 40 forming a forward carrier stop, the other end being belled at 41 and provided just inboard thereof with a typical carrier rebound stop 42. Into the bell 41 is spigotted the end of the carrier receive tube 50 which curves downwardly in the terminal through its base 10, being connected on the way to the intake of a blower B driven by a motor M, both of which are also suitably mounted on the base 10 within the terminal. The chamber air return spigot 39 is also connected by a return tube 51 into the blower intake while the send tube 52 rises up through the base 10 and is connected by a cross tube 53 to the blower output. Above the cross tube 53 the send tube 52 enters a typical send valve assembly 54 which leads up through an adapter 55 under and connected to the lower end of the send tube mouth 20. Finally, the receive tube 50 and the send valve 54 are equipped with typical blower-off and blower-on switches SW1 and SW2.

An incoming carrier, as it progresses up the receive tube 50, gradually assumes a horizontal attitude, the air ahead of it circulating down through the well 38 and return tube 51 back to the blower B. As the carrier enters the rear section 37 of the inner chamber 30, it overrides the rebound stop 42 and recoils from the bumper 40, the stop 42 then acting to prevent the carrier from thereupon rebounding back down the send tube 50. The carrier thus comes to rest, then rolls down the floor 32 of the chamber front section 31 and against the rear face of the door 33. The door springs 35 (or counterweights) are sized so that they are then overcome by the pressure of the carrier, whereupon the door 33 opens to form the ramp 35 closing over the send tube mouth 20. The carrier rolls forwardly into the compartment 26, first onto the ramp 36, then onto the ramp 18, and finally comes to rest in the ledge 19 against the return lever 21, the springs 35 (or counterweights) thereupon reclosing the door 33. It will be understood, of course, that the transverse width of the carrier chamber 30 and the spacing of the side walls 16 are sufficient to accommodate the carrier in the manner just described. Also, the ramp 18 must be deep enough so that when the carrier is finally at rest in the ledge 19, it is free of the forward edge of the door 33 so that the latter can close. A customer can then pick up the presented carrier and drop or toss it in the send tube mouth 20 which is now exposed owing to the closure of the door 33. The carrier thence passes end first down through the adapter 55, the receive valve 53 and into the send tube 52 to the teller station. The teller returns the carrier through the receive tube 50 as previously described, the carrier again being presented on the ledge 19. The customer picks it up, then replaces it on the ledge 19 ready for the next customer, and drives away. Should the teller wish to return the carrier at any time independently of a customer, he merely activates the solenoid S1 so that the lever 21 flips the carrier rearwardly into the open send tube mouth 20. However the carrier is returned to the compartment 26, the side walls 16 and the chamber door 33 closely surrounding the adjacent edges 17d of the send tube mouth 20 form "bankboards", as it were, to insure that the carrier falls into the mouth 20. The switches SW1 and SW2, which of course have their counterparts at the teller station, provide for intermittent, as opposed to continuous, operation of the blower B so that the latter runs only when a carrier is actually being sent through the system.

Any suitable electrical controls and connections beyond those described can be provided for operating the system in the foregoing manner. Indeed, the required electrical circuits are quite simple and straightforward. Since these and other aspects of the pneumatic system and the terminal will be apparent to those skilled in the art and form no part of the present invention, they need not be further described. Finally, though the present invention has been described in terms of a particular embodiment, being the best mode known of carrying out the invention, it is not limited to that embodiment alone. Instead, the following claims are to be read as encompassing all adaptations and modifications of the invention falling within its spirit and scope.

We claim:

1. In a customer terminal for a pneumatic banking system having carrier send and receive tubes opening up through the terminal, the terminal including a compartment therein opening through a terminal front wall for access by customers, the compartment having a pair of forwardly disposed opposite side walls spaced apart a width greater than the axial length of a generally cylindrical carrier for use with the system, the improvement comprising: a carrier receive chamber disposed at the rear of and having a transverse front opening into the compartment; an air return tube opening into the chamber; a transverse door closing the front opening of the chamber and hinged to open forwardly and downwardly into the compartment between its side walls, the receive tube opening into the chamber so that a carrier entering the chamber is disposed therein in a horizontal attitude with its axis transversely of the compartment side walls and is directed against the door, the door forming when open a forwardly and downwardly inclined carrier ramp from the chamber down which a carrier disposed in the chamber as aforesaid will roll therefrom; means normally biasing the door to its closed position and effective so that a carrier when disposed as aforesaid against the door will overcome the biasing means and open the door to its ramp forming position; a funneled send tube mouth opening up into the compartment and disposed below and covered by the chamber door when in its ramp forming position and above and connected to the send tube, the send tube mouth being effective to receive a carrier tossed therein and to orient the carrier into an upright position so that the weight of same dispatches the carrier end first down the send tube, the compartment side walls and the door when closed closely surrounding the adjacent margins of the send tube mouth; and carrier receiving means in the compartment disposed forwardly of the send tube mouth and the forwardmost edge of the chamber door when in its ramp forming position, the carrier receiving means being effective to halt and retain a carrier in position for access by a customer through the front of the compartment after the carrier has rolled forwardly off the rear face of the door and disposed to thereafter allow the biasing means to close the door.

2. The terminal of claim 1 including teller activated means associated with the carrier receiving means to impel a carrier in its customer access position rearwardly into the send tube mouth.

3. The terminal of claim 2 wherein the chamber includes opposite side wall portions and an inclined floor, the receive tube entering the chamber through a first one of the side portions, the second of the side portions serving as a forward stop for a carrier arriving in the chamber, the chamber floor being disposed forwardly of said side wall portions and serving to direct a carrier against the rear face of the chamber door as aforesaid.

4. The terminal of claim 3 wherein the chamber comprises an integrally molded assembly including a well in a lower portion thereof rearwardly of said floor having an opening therein for the air receive tube, the first of said chamber side portions forming a fitting for the receive tube and the second of the chamber side portions having a cushion providing said forward stop, and including a rebound stop for a carrier arriving in the chamber to prevent the same from rebounding from the cushion back into the receive tube, the rebound stop being disposed adjacent the inboard end of said fitting for the receive tube.

5. The terminal of claim 3 wherein the carrier receiving means comprises a transverse ledge across the forward end of the compartment, and the teller activated means comprises a solenoid actuated lever horizontally pivoted at one end below the compartment, the other end of the lever emerging through the ledge and against the forward central portion of the body of a carrier in its customer access position.

6. The terminal of claim 5 including a teller activated door for optionally closing the open front of the compartment, the door being slidable across the compartment front opening forwardly of a carrier in its customer access position.

* * * * *